Oct. 28, 1958    W. R. LAWTON    2,857,931
INSULATED PIPE AND METHOD OF MAKING THE SAME
Filed March 24, 1955

INVENTOR.
WILLIAM R. LAWTON
BY
Arthur H. Van Horn
his ATTORNEY

United States Patent Office 2,857,931
Patented Oct. 28, 1958

2,857,931

INSULATED PIPE AND METHOD OF MAKING THE SAME

William R. Lawton, Akron, Ohio, assignor to The R-W Mfg. Co., Barberton, Ohio, a corporation of Ohio Application March 24, 1955, Serial No. 496,402

5 Claims. (Cl. 138—64)

This invention relates to insulated pipes and prefabricated pipe lines or conduits and more particularly relates to structures of this kind employed in underground and above-ground installations, such as for conveying hot or cold fluids, vapors, or liquids or a combination thereof. The invention also relates to the method of applying an insulation covering to the pipes or pipe sections.

Heretofore, it has been the practice to enclose one or more fluid conduits or pipes for carrying a hot and/or cold fluid in an outer shell or casing and to seal the space between the inner pipes or conduits and the outer casing to provide a dead air space therein or to pack the space with heat insulating material, such as asbestos or the like, in order to prevent heat exchange between the fluids carried by the pipes and the exterior of the casing. It has been the custom for a long time to employ outer casings of ceramic material, cast iron or even tubular light gauge steel which, in some instances, were corrugated to provide additional strength, and to provide within these casings spacers for supporting the inner pipes therein. In addition, it was the custom to provide sealing means in these casings and to employ the use of roller or fixed pipe supports for supporting the pipes longitudinally within the outer casing. Many problems arose with such structures such as drainage due to condensation within the outer casing, electrolytic deterioration of the casing, and high costs involved in assembly even where units were prefabricated at the factory to be assembled later at the site of use. These high costs were primarily due to the labor factor in setting spacers, plugging, installation of pipe supports and many other steps which prevented actual low cost manufacture of reliable, simple in structure and effective units or piping systems.

It is one of the objects of this invention to overcome and eliminate the problems and disadvantages resulting from the structures heretofore known and used, including the disadvantages and problems outlined above and to produce a simple, low cost insulated pipe structure either in prefabricated units or as assembled fluid distribution systems.

Another important object of this invention is to eliminate the necessity for the use of an outer casing for insulated conduits such as underground or aboveground water, steam or other fluid systems.

Another object of the invention is to apply insulation material having high structural strength directly to the pipe or conduit outer surface.

Another object of the invention is to construct pipe line units including one or more fluid transmission pipes in which each pipe outer wall is enclosed or encased in a cellular resinous insulating composition having a varying ratio of unicellular to open cell structures and in which the individual cells are of uniformly small size, imparting high compressive strength to the covering material, improving its thermal insulating properties, its shock resistance, flexibility and vibration resistance.

A further object of this invention is to construct an insulated fluid conveying pipe unit having an outer body formed of a cellular resinous insulated composition surrounding the pipe outer wall and bonded to said outer wall.

A still further object of this invention consists in molding a cellular insulating composition directly about and bonded to the outer wall of a fluid conducting pipe.

Another object of the invention is to foam a resinous composition in contact with the outer wall of a pipe section by surrounding the wall with a mold device and depositing a predetermined quantity of the composition between the mold and pipe wall and then causing the deposited composition to expand and foam to produce a cellular mass between the outer pipe wall and the mold inner wall and to thereby substantially fill the space between said walls.

A still further object of this invention is to employ compositions such as are disclosed in my copending application Serial No. 477,423, filed December 23, 1954, for Cellular Plastic Material and Process of Making the Same, which compositions can be foamed in place at room temperatures to produce a controlled variable unicell to open cell ratio in the material.

A further object consists in producing an insulated pipe or fluid conducting conduit suitable for underground use which eliminates the use of an outer pipe casing for supporting the pipe and intermediate insulation, and which can be produced at low cost either at the factory or at the site of use and which is materially lighter in weight as compared with cased in pipe sections of the prior art and in which the pipe and its contents in use are protected against heat exchange, electrolytic activity and which affords protection against corrosion due to acid and alkali conditions or the presence of moisture.

An additional object is an insulated pipe unit in which the foamed insulation compound may be pre-molded in complementary sections and subsequently removably applied to the pipe units.

Another object consists in bonding a foamed synthetic resinous insulation material directly to the outer wall of a pipe section by first applying to the outer wall of the pipe a coating of bonding material.

Another object of the invention is to provide an insulating covering for pipes conveying hot or cold fluids, liquids or vapors in which the covering is formed of a foamed resinous cellular material provided with a smooth outer circumferential surface in the nature of a thin wall or skin for the purpose of closing the surface cells of said material.

A still further object of the invention is a new and improved method of producing insulated pipes or pipe units.

Other objects and advantages of this invention will become more apparent as the following description of an embodiment thereof progresses, reference being made to the accompanying drawing in which like reference characters are employed to designate like parts throughout the same.

Figure 1:
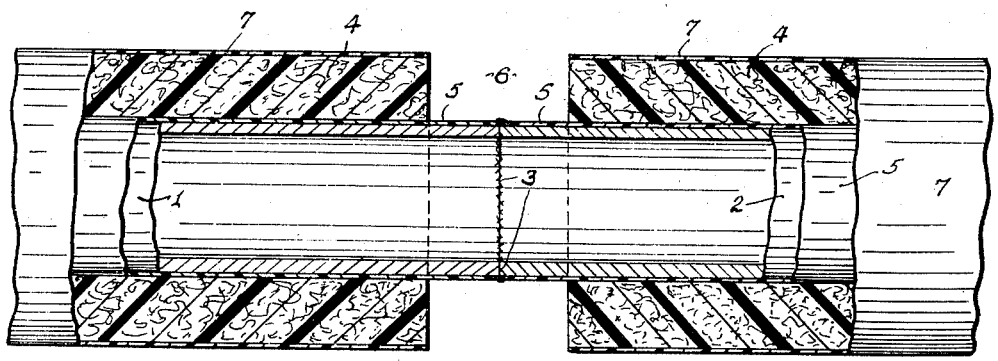
Figure 1 is a part sectional and part elevational view of the adjacent ends of two insulated pipe sections shown with the immediate adjacent ends of the pipes exposed beyond the insulating covering for joining the two sections together and which may be butt welded together.
Figure 2:
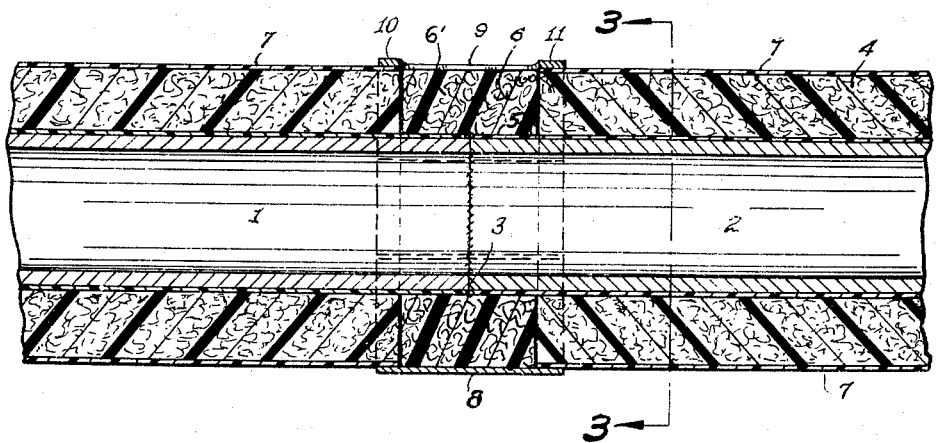
Figure 2 is a view similar to that shown in Figure 1 and in addition illustrates how the space between the insulation of the adjacent ends of the welded pipe sections may be filled with insulating material to be molded around the joint and to thereby form a continuous insulating covering with the insulated covering of the pipe units.

Referring more particularly to the drawings in which I have illustrated an embodiment of my invention, underground or aboveground piping systems for carrying hot and/or cold fluids, liquids or vapors are made up of a number of units or sections, the end portions of adjacent sections being secured together, as by welding. In Figs. 1 and 2, I have illustrated two such sections of metal pipe at 1 and 2 butt welded together circumferentially at 3 to form a continuous passage for a fluid.

An insulating covering for the pipe sections is shown at 4 and is applied to each section or unit separately as will be more fully explained hereinafter. This insulation covering for each unit comprises a material or composition having high structural strength as well as high thermal insulating properties such as will accomplish one of the important ends to which this invention is directed, namely, to eliminate the necessity for and the use of an outer casing enclosing the insulation and the pipe.

One manner of carrying out my present invention is to first apply a bonding layer indicated generally at 5 which is preferably a thin coating or skin applied directly to the clean outer surface of the pipe sections. I have used and have found to be entirely satisfactory for the purpose a compound consisting of 3 mols. of Empol 1022 and 4½ mols. of triethanolamine cooked together to an acid value up to about 5 and thinned to 45% volume with methyl ethyl ketone and 6.75 gr. Desmodur T per 100 gr. of ketone. The pot life of this composition is about 40 minutes. This compound may be sprayed, brushed or otherwise applied as a thin coating or skin to the cleaned pipe outer surface.

While this skin is still warm, the insulation covering may be applied and bonded to the outer skin surface.

In my copending application identified above, there are disclosed several examples of compounds which are particularly desirable for use as insulation as applied to pipes, conduits or the like for conveying fluids.

In carrying out the present invention, an example of a foamed cellular synthetic resin insulation covering for a length of 4" standard pipe wherein it is desired to apply the insulation to a thickness of 1¾" throughout a length of 5' along the pipe, may consist of a suitable basic resin comprising 10 mols. of Empol 1022 and 8 mols. of triethanolamine cooked to an acid value of 30–35 and thinned to 87% non volatile with methyl-ethyl-ketone. Empol 1022 is the trade mark used by Emery Industries to designate the dimerization product of an unsaturated fatty acid and sold by that company.

To 14 lbs. and 12½ ozs. of such basic resin mixture is then added and thoroughly mixed 79 gr. of water, a 6% cobalt drier in the amount of 63 cc., and 8 cc. of Dow Corning 550 silicone fluid.

To this mixture is then added 2530 gr. of Desmodur-T (polyisocyanate) and the complete composition is then thoroughly agitated for thirty to forty seconds and then poured quickly into the pipe mold and baked for a period of about two hours at a temperature of substantially 250° F.

As explained above, the mold (not shown in the drawing) is placed around the pipe, which may have been previously greased, to receive the completed mixture, and is axially in substantial alignment with the pipe axis, leaving a space between the skin on the outer wall of the pipe and the inner wall of the mold to receive the insulation composition which, as stated above, after being thoroughly mixed with the Desmodur-T and agitated for the time indicated, is quickly poured into the mold. As indicated above, after the composition has been placed in the mold for the purpose specified, the composition will foam and expand throughout a 5' length along the pipe to form a cellular mass comprising large numbers of individual voids or unicells of a more or less uniform small size as the composition is left to cool in the mold. If desired, however, the pipe wall may be greased before applying the skin layer 5, thus facilitating removal of the molded insulation axially of the pipe after it has set.

When the material has cooled down and is fully foamed and expanded, the mold may be removed, whereupon the insulation covering will be bonded to the skin 5 which previously had been applied to the clean outer wall of the pipe and will form an insulating covering having physical properties which are extremely desirable for the purpose for which the material is used. The foamed covering is found to have a density of about 12 pounds per cubic foot, its K-factor will be superior to 85% magnesia while its heat resistance will withstand a temperature from approximately −20° F. to 340° F. I have also found that there is less than 1% by volume of water pick-up by such a covering over a six-week period when immersed in water under a head of one foot.

This foamed cellular synthetic resin insulation covering will be found to have a stretch of about 25% of its original length without breaking and can be compressed to about 75% of its original volume without fracture of the cells. I have also found in tests that such a covering will stand a drop test of thirty feet onto a concrete surface without rupture. Furthermore, the thermal coefficient expansion is within 5% of that of steel and in addition the material is an excellent thermal insulator. It is also a satisfactory dielectric.

Referring again to the drawing, Figs. 1 and 2 illustrate the adjacent ends of two abutting insulated pipe units forming a part of either an underground or overhead fluid distribution system and embodying the present invention. As disclosed hereinbefore, these aligned pipe ends are welded together as at 3. In Fig. 1, it will be noted that these adjacent end portions extend beyond the insulation covering 4 providing a work space 6 giving access to welding tools for welding the pipe ends together. This is of particular advantage where the units are to be assembled in a trench for underground use where the welding can be performed below level. The skin layers 5 on the pipe extend beyond the insulation 4 and meet at the weld line 3. These portions of the skin will, like the portions extending away from the exposed pipe ends, serve as a bonding means for insulation material which will subsequently fill the space 6.

The insulation 4 on each pipe unit is provided with an outer skin 7 of substantially the same material as the skin 5 and which is applied to the outer surface of the insulation 4 to close off voids or cells opening outwardly and also to provide a smooth continuous outer surface.

In Fig. 2, I have shown a band 8 having a slot or opening 9 encircling the opening 6 and having peripheral portions 10 and 11 overlying the adjacent ends of the insulation coverings 4, thus substantially closing the space 6 between the insulation members 4 except for the opening 9 in the band which is provided for the purpose of pouring additional foamed cellular synthetic resin insulation 6' of the type described above and which, when deposited within the space 6 and allowed to foam, will completely cover the previously exposed ends of the skin and pipe sections and will fill the space enclosed by the band 8. This foamed insulation 6' will, of course, be bonded with the ends of the respective insulation coverings 4 to provide a continuous insulation covering throughout the length of the connected pipe units. After the foamed insulation applied within the space 6 has been set and filled this space, the band 8 which actually serves as a mold may be removed. The band 8 is removably applied to the adjacent spaced apart ends of the insulation sections 4 by contracting the same thereabout to provide a mold for the space 6 to receive the additional foamed insulation material. For this purpose, the band 8 is open or split transversely and may be provided with suitable cooperating means on its end portions for removably holding the contracted band securely in place, as in Figs. 2 and 3, until the additional insulation material has set, whereupon the band may then be removed.

The outer surface of the foamed insulation filling the space 6 may likewise be provided with an impervious skin layer which, in effect, can be a continuation of the skin 7 on each pipe unit.

Figure 4:
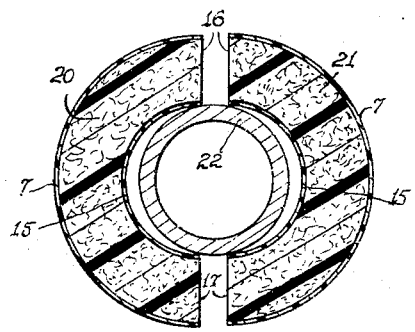
Figure 4 is a transverse sectional view of complementary sections comprising a filler for the end space between the insulation and the adjacent welded pipe ends.

In Fig. 4, I have illustrated an application of the invention in the form of complementary insulation covering units 20 and 21 which, as illustrated in this figure, are of semi-circular form and are intended to completely embrace a pipe 22 by bringing the sections 20 and 21 together about the pipe and then bonding the same together and with the pipe by an application of a thin layer of the skin material.

It will be noted in this connection that the insulation members 20 and 21 are not bonded to the outer wall of the pipe 22 which has been greased to permit easy removal of the members, but the inner surfaces of these sections are sealed by means of a skin layer 15. In this form of the invention, these complementary sections may be removably applied to a pipe unit by first greasing the pipe outer wall, whereas in the embodiment illustrated in Figs. 1 to 3, inclusive, the outer insulation coverings are bonded to the pipe wall by means of skin 5 and remain a permanent covering for the pipe. Such sectional portions may be cut or formed in a width to snugly fill the space 6 and are assembled together on the pipe by the application of skin material to the adjacent surfaces 16 and 17 and then bringing these surfaces together under sealing pressures.

Figure 3:
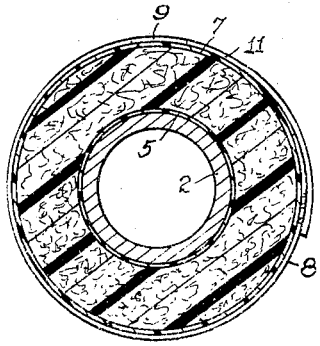
Figure 3 is a section taken on the line 3—3 of Figure 2.

The outer skin 7 shown as applied to the embodiment illustrated in Figs. 1 to 3, inclusive, may be dispensed with, if desired, under circumstances where voids opening through the outer surface are unobjectionable. The outer skin 7 is, however, preferred where it is desired to close off such voids and to provide a smooth continuous outer surface for the insulation.

It will be understood from the above disclosure that by this invention I have contributed a very important step forward in the art of insulated pipe systems or units thereof inasmuch as the outer supporting and protective casings heretofore employed which usually consist of cast iron or thin walled metallic casings or even ceramic casings, have been eliminated.

Due to the physical characteristics of the insulating covering 4 and 20 and 21, such outer casings are unnecessary and this permits the construction of units not only lighter in weight but having high insulating qualities. By this invention also, the nuisances and problems arising from condensation which in the prior art took place within an outer casing enclosing an insulated pipe system are entirely eliminated.

Furthermore, this invention employs a new method or process of producing an insulated pipe unit or system as a new article of manufacture, which method is extremely simple in carrying out the intents and purposes of this invention.

Various changes may be made in the details of construction and arrangement of parts of the invention without departing from the spirit thereof or the scope of the appended claims.

I claim:

1. An insulated pipe unit for conveying fluids comprising a length of pipe, a thin bonding skin or layer on said pipe outer surface, and an outer body of an insulating composition comprising a foamed cellular synthetic resinous composition having an effective thermal resistance substantially between —20° F. and 340° F. bonded to said thin layer, the outer exposed surface of said composition being smooth and substantially free of open voids.

2. An insulated pipe line for conveying fluids comprising a plurality of lengths of pipe joined together in end to end relation, and an outermost load sustaining insulating casing for said line comprising a plurality of cylindrical unitary insulating jacket members surrounding said pipe line outer wall, the adjacent ends of adjacent jacket members having a bonded connection together to form a continuous insulating covering for said pipe line, said jacket members consisting of a substantially uniform cellular foamed synthetic resin, the outer surface of said bonded members being smooth and substantially free of open voids.

3. The method of making insulated pipe units for use in a fluid distribution system which comprises the steps of applying a thin layer of resinous material to a cleaned outer pipe surface, then surrounding said pipe with a mold to provide a space between the mold and the layer for receiving a synthetic resinous insulation composition having an effective thermal resistance substantially between —20° F. and 340° F., delivering a predetermined quantity of said composition into said space, then causing said composition to foam in place and to expand to substantially fill said space, allowing said foamed composition to set, then removing said mold, and then forming a smooth outer exposed surface to said set foamed composition.

4. The method of making insulated pipe units for use in a fluid distribution system which comprises the steps of applying a thin layer of resinous material to a cleaned outer pipe surface, then surrounding said pipe with a mold to provide a space between the mold and the layer for receiving a synthetic resinous insulation composition having an effective thermal resistance substantially between —20° F. and 340° F., delivering a predetermined quantity of said composition into said space, then causing said composition to foam in place and to expand to substantially fill said space, then allowing said foamed composition to set, and then removing said mold.

5. The method of making insulated pipe units for use in a fluid distribution system which comprises the steps of applying a thin layer of warm resinous material substantially in the liquid state to a cleaned outer pipe surface, surrounding said pipe with a mold to provide a space between the mold and the said layer for receiving a synthetic resinous insulation composition having an effective thermal resistance substantially between —20° F. and 340° F., delivering a predetermined quantity of said composition into said space before said thin layer has set, then causing said composition to foam in place and to expand to substantially fill said space, allowing said foamed composition to set and to bond to said thin layer, then removing the mold.

References Cited in the file of this patent

UNITED STATES PATENTS

| | | |
|---|---|---|
| 2,085,047 | Schneider | June 29, 1937 |
| 2,091,335 | Roberts et al. | Aug. 31, 1937 |
| 2,465,799 | Gravesen | Mar. 29, 1949 |
| 2,552,641 | Morrison | May 15, 1951 |
| 2,557,280 | Simon et al. | Dec. 4, 1951 |
| 2,576,073 | Kropa et al. | Nov. 20, 1951 |
| 2,602,764 | Billingham | July 8, 1952 |
| 2,629,698 | Sterling | Feb. 24, 1953 |
| 2,650,180 | Walker | Aug. 25, 1953 |
| 2,658,527 | Kaiser | Nov. 10, 1953 |
| 2,717,848 | Jaye | Sept. 13, 1955 |
| 2,742,384 | Burleson | Apr. 17, 1956 |